Oct. 4, 1955                G. A. WALDIE              2,719,953

MECHANISM FOR LOCATING INHOMOGENEITIES IN A MAGNETIZED ARTICLE

Filed March 29, 1952                          5 Sheets-Sheet 1

*Fig. 1.*

INVENTOR
GEORGE A. WALDIE

Oct. 4, 1955 G. A. WALDIE 2,719,953
MECHANISM FOR LOCATING INHOMOGENEITIES IN A MAGNETIZED ARTICLE
Filed March 29, 1952 5 Sheets-Sheet 4

INVENTOR
GEORGE A. WALDIE

Oct. 4, 1955 G. A. WALDIE 2,719,953
MECHANISM FOR LOCATING INHOMOGENEITIES IN A MAGNETIZED ARTICLE
Filed March 29, 1952 5 Sheets-Sheet 5

INVENTOR
GEORGE A. WALDIE

United States Patent Office 2,719,953
Patented Oct. 4, 1955

2,719,953

MECHANISM FOR LOCATING INHOMOGENEITIES IN A MAGNETIZED ARTICLE

George A. Waldie, Sharon Township, Franklin County, Ohio, assignor, by mesne assignments, to The Youngstown Sheet and Tube Company, Youngstown, Ohio, a corporation of Ohio Application March 29, 1952, Serial No. 279,482

10 Claims. (Cl. 324—37)

This invention relates to mechanism for locating inhomogeneities in a magnetized article. It has to do particularly with the locating of inhomogeneities in a magnetized article in a continuous manner, i. e., while the mechanism and the magnetized article relatively move one past the other.

While in its broadest aspects the invention is of general application in the locating of inhomogeneities in a magnetized article while the locating mechanism and the magnetized article relatively move one past the other, the invention will be hereinafter described for purposes of explanation and illustration as embodied in mechanism for locating inhomogeneities in a magnetized elongated article which by way of example will be considered as being a magnetized hollow article. The invention has been utilized in the locating of inhomogeneities in lengths of pipe.

Either the magnetized article or the mechanism may move while the other remains stationary or both may move at the same time in effecting the relative movement of the mechanism and the magnetized article one past the other. In locating inhomogeneities in pipe it is deemed preferable to mount the mechanism at an operating station and pass lengths of pipe axially through the operating station where the mechanism is effective for locating inhomogeneities. The mechanism is preferably disposed outside the pipe.

The invention has especial utility in the locating of inhomogeneities in a selected longitudinal element of a magnetized elongated article. For example, the invention may be employed in the locating of inhomogeneities in a longitudinal weld of a magnetized elongated article, such, for example, as a welded pipe in which the weld extends parallel to the pipe axis. It is important that the weld in such welded pipe be substantially homogeneous and strong so that the pipe will satisfactorily perform its intended function in use. If the weld contains a flaw or inhomogeneity the pipe when subjected to the pressure of a contained fluid may leak or rupture at or adjacent the location of the flaw. Consequently it is important to find flaws in pipe welds before the pipes are put into service.

Welded pipe of the type above referred to may be formed by simultaneously advancing skelp and bending it into generally cylindrical form with its edges either butted or lapped and in a continuous operation as the skelp advances welding the edges together. The welding may be effected in various ways, as, for example, by electric welding or flame welding. For example, skelp with butted edges may be electrically welded to form pipe, the welding being effected continuously as the skelp and subsequently the pipe advances axially. The weld is preferably predeterminedly oriented, normally being at the top of the pipe as the pipe issues axially in a generally horizontal direction from the welding apparatus. It is desirable to test the weld for inhomogeneities immediately after it issues from the welding apparatus as at such time the weld is predeterminedly oriented so that the mechanism for locating inhomogeneities may be conveniently mounted so that the sensing means carried thereby and presently to be described may be adjacent or in juxtaposition to the weld during testing. The mechanism for locating inhomogeneities is preferably stationarily mounted outside the magnetized welded pipe and with the sensing means in immediate proximity to the path of the weld. In this way the mechanism locates inhomogeneities at and immediately adjacent the weld.

In copending application Serial No. 279,348, filed of even date herewith, is disclosed mechanism for locating inhomogeneities in a magnetized article comprising sensing means adapted to pass through magnetic flux in space adjacent the magnetized article caused by inhomogeneities in the magnetized article whereby a flow of current is induced in the sensing means. Actually an electromotive force is induced in the sensing means which causes a flow of current in a circuit as will be explained. The current flowing in the circuit may be of very small magnitude. The term "flow of current" is herein used synonymously with "electromotive force" where the context so indicates. As disclosed in that application the sensing means may be and preferably are carried by a head movable, preferably rotatively, adjacent the magnetized article during relative movement of the mechanism and the magnetized article one past the other, the sensing means preferably being moved in a path having portions approaching and receding from the magnetized article, which portions are non-parallel to all planes containing the line along which the mechanism and the magnetized article relatively move one past the other.

The magnetized article may be tested at any temperature not higher than the Curie point (the temperature at which ferrous metal loses its magnetic property). It is normally preferable to test the magnetized article while hot; this is especially the case in the testing of welded pipe which is welded continuously as it advances and whose movement relatively to the mechanism for locating inhomogeneities may be the movement imparted by the welding apparatus. Rapidly rotating or whirling sensing means are especially well adapted for the testing of hot magnetized articles since each element of the sensing means is in immediate proximity to the hot magnetized article through only a small fraction of the time and the rapidly rotating or whirling motion of the sensing means cools the sensing means by convection. The cooling may be effected simply by the relative motion between the sensing means and surrounding air, or air or other cooling medium under pressure may be directed upon the sensing means. The employment of a rapidly whirling sensing head is of especial utility and advantage in locating inhomogeneities in a newly formed and still hot weld, such, for example, as the longitudinal weld of welded pipe.

Said application also discloses indicating means with which the sensing means are connected, the indicating means being operated by the current induced in the sensing means by inhomogeneities in the magnetized article to indicate portions of the magnetized article having inhomogeneities.

The present invention contemplates certain improvements whereby the operation of the mechanism is improved and superior results are obtained. The mechanism for locating inhomogeneites preferably comprises a head rotatable adjacent the magnetized article during relative movement of the mechanism and the magnetized article one past the other, the head being mounted for rotation generally in a plane at an acute angle to the direction of relative movement of the mechanism and the magnetized article one past the other, the head preferably having its portion nearest the magnetized article shaped so that the surface thereof at each point therealong when it comes into the closest proximity with the magnetized article lies close and substantially parallel to the magnetized article and said portion of the head preferably carrying sensing means passing through magnetic flux in space adjacent the magnetized article caused by inhomogeneities in the magnetized article as the head rotates whereby a flow of current is induced in the sensing means.

The end of the head nearest the magnetized article preferably has a frusto-conical surface each element of which when the closest proximity with the magnetized article lies substantially parallel to the direction of relative movement of the mechanism and the magnetized article one past the other. The head preferably carries a plurality of sensing units which are spaced about the axis of rotation of the head, each of the sensing units preferably being arranged substantially perpendicular to the element of said frusto-conical surface nearest the center thereof.

The mechanism preferably comprises a support for the sensing means together with means for moving the support to retract the sensing means away from the magnetized article. The sensing means are preferably pivoted to the support eccentrically with respect to the center of gravity of the sensing means so that when the support moves to retract the sensing means away from the magnetized article the sensing means turns relatively to the support. Means are preferably provided limiting the extent of such turning movement of the sensing means to maintain the sensing means in approximate orientation for return to operative position relatively to the magnetized article. The mechanism preferably comprises an operating head including sensing means, a support for the head, means for moving the support to retract the head away from the magnetized article, the head having means for engaging with the magnetized article to relatively position the sensing means and the magnetized article upon relative movement of the defect locating mechanism and the magnetized article one past the other, the head being pivoted to the support eccentrically with respect to the center of gravity of the head so that when the support moves to retract the head away from the magnetized article the head turns relatively to the support, and means extending between the support and the head limiting the extent of such turning movement of the head to maintain the head in approximate orientation for return to operative position relatively to the magnetized article.

In a preferred structure the mechanism includes a support, an operating head pivoted to the support eccentrically with respect to the center of gravity of the operating head for free turning movement about its pivotal connection with the support, the operating head having means adapted to engage the magnetized article during relative movement of the defect locating mechanism and the magnetized article one past the other to operatively position the operating head relatively to the magnetized article, means for moving the support to retract the operating head away from the magnetized article and means maintaining the operating head in approximate orientation for return to operative position relatively to the magnetized article when the operating head has been retracted away from the magnetized article.

I further provide, in mechanism for locating inhomogeneities in a magnetized article, the mechanism and the magnetized article being arranged for relative movement one past the other, a support inclined to the direction of relative movement of the defect locating mechanism and the magnetized article one past the other and rotatable sensing means carried by the support and adjustable therealong to proper cooperative position relatively to the magnetized article whereby the sensing means rotate in a plane intersecting the direction of relative movement of the defect locating mechanism and the magnetized article one past the other. Preferably the mechanism and the magnetized article are arranged for relative generally rectilinear movement one past the other and a support is provided extending generally transversely of the line along which the defect locating mechanism and the magnetized article relatively move generally rectilinearly one past the other but inclined to said line together with rotatable sensing means carried by the support and adjustable therealong to proper cooperative position relatively to the magnetized article whereby the sensing means rotate in a plane intersecting said line. I preferably provide a pivoted arm, sensing means pivoted to the arm and adapted upon pivotal movement of the arm to be moved generally in a plane containing a straight line parallel to the direction of relative generally rectilinear movement of the mechanism and the magnetized article whereby the sensing means are shifted between operative position adjacent the magnetized article and inoperative position relatively remote from the magnetized article, means connected with the arm for pivotally moving the arm, the sensing means having positioning means whereby the sensing means are properly oriented for cooperation with the magnetized article when the sensing means are in operative position and a connection between the sensing means and the arm maintaining the sensing means when in inoperative position in such orientation as to assume properly oriented position relatively to the magnetized article upon pivotal movement of the arm to bring the sensing means into operative position.

Other details, objects and advantages of the invention will become apparent as the following description of a present preferred embodiment thereof proceeds.

In the accompanying drawings I have shown a present preferred embodiment of the invention in which Figure 1 is a plan view of mechanism for locating inhomogeneities in a magnetized article;

Figure 2:
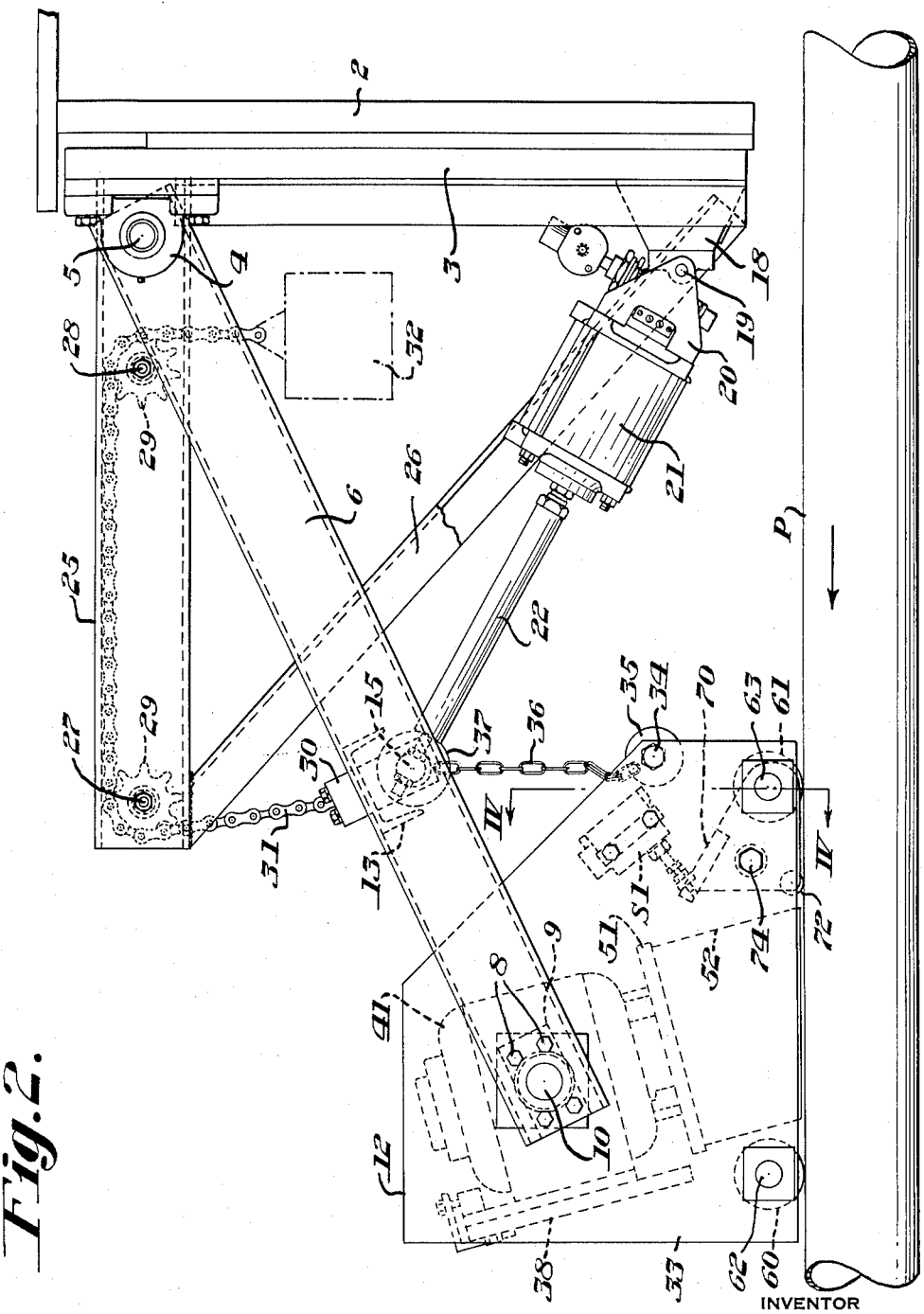
Figure 2 is an elevational view of the mechanism shown in Figure 1.

Referring now more particularly to the drawings, the mechanism for locating inhomogeneities is carried by a plate 2 (Figure 2) which, for purposes of explanation and illustration, may be considered as being mounted on the pull-out stand of an electric weld mill in which skelp is bent into generally cylindrical form with its edges butting and the butted edges of the skelp are electrically welded together, the weld being disposed at the top of the pipe as the pipe is delivered by the electric weld mill axially of the pipe and generally horizontally from right to left viewing Figure 2 as indicated by the arrow in that figure. The apparatus for locating inhomogeneities in the weld is mounted to lie above the pipe and with the sensing means presently to be described adjacent the path of the weld which is substantially a line in the top of the pipe parallel to its axis. A pipe being tested is indicated at P in Figure 2. As the pipe advances from right to left it is suitably supported and guided for straight line movement by means not shown.

The plate 2 carries a second plate 3 which is the mounting plate for the mechanism, the plate 3 being vertically adjustable relatively to the plate 2, as, for example, by a dovetail connection between the plates, and being adapted to be fastened in position at selected elevations. Normally the vertically adjustable plate 3 is fastened in a predetermined position when the mechanism is to test pipe of a particular diameter.

The plate 3 carries ball bearing pillow blocks 4 in which is mounted for rotation a shaft 5. Fastened to the shaft 5 are arms 6 which project therefrom in parallel relation. Each of the arms 6 is shown as being made out of a steel channel with a collar 7 welded into the web of the channel, the shaft 5 passing through the collars 7. Thus the arms 6 are mounted upon the shaft 5 to turn therewith about the axis of the shaft.

Each of the arms 6 has bolted thereto by bolts 8 a bracket 9 carrying a trunnion 10. The trunnions 10 are coaxial and project toward each other. Disposed about each trunnion 10 is a bearing 11. The bearings 11 cooperatively carry for turning movement about the common axis of the trunnions 10 a carrier 12 presently to be described.

A cross channel 13 extends between the arms 6 and is welded to each thereof, thus tying the arms 6 together into a unitary supporting structure. The channel 13 carries brackets 14 in which is journaled a short transverse shaft 15 having intermediate the brackets opposed flattened face portions 16 and having a bore therethrough intersecting the flattened face portions 16 with the axis of the bore normal to the flat faces. Bolted to the plate 3 by bolts 17 is a bracket 18 to which is pivoted by a pivot pin 19 a bracket 20 carrying a cylinder 21 in which operates a piston whose piston rod has an extension 22 provided with a reduced threaded extremity 23 passing through the bore in the shaft 15. Suitable means later to be referred to are provided for admitting fluid under pressure to the respective faces of the piston in the cylinder 21 and exhausting the fluid. Nuts 24 applied to the threaded extremity 23 and bearing against the opposed flat faces 16 adjustably position the extension 22 relatively to the shaft 15. Movement of the piston in the cylinder 21 upwardly and toward the left viewing Figure 2 thus causes the left-hand ends of the arms 6 viewing Figures 1, 2 and 3 to rise, the arms partaking of pivoal movement about the axis of the shaft 5. Since the carrier 12 is mounted upon the arms 6 as above explained it will be caused to rise when the piston in the cylinder 21 moves upwardly and toward the left viewing Figure 2. When the piston moves downwardly and toward the right the carrier 12 moves downwardly.

Bolted to the plate 3 is a stationary supporting structure comprising opposed generally horizontal members 25 and inclined members 26. Extending between the members 25 are two shafts 27 and 28, respectively, both of such shafts having their axes horizontal and parallel to each other. Each of the shafts 27 and 28 carries two sprockets 29 spaced apart thereon. Connected with the cross channel 13 by connecting devices 30 are two sprocket chains 31. One of the sprocket chains 31 passes about one pair of aligned sprockets 29 and the other chain passes about the other pair of aligned sprockets 29, the right-hand ends of both chains extending downwardly as shown in Figure 2 where they carry a counterweight 32. The counterweight tends to counterbalance the weight of the carrier 12 and the mechanism carried thereby.

The carrier 12 comprises opposed side plates 33 which are connected together by suitable cross members which maintain the side plates 33 rigidly in parallel spaced apart relationship. Each side plate 33 is carried by one of the bearings 11. One of the cross members is a rod 34 about which is disposed a loosely fitting ring 35 to which is connected the lower end of a length of chain 36. The upper end of the length of chain 36 is connected to a ring 37 loosely fitting about the shaft 15. Thus when the arms 6 are caused to pivot upwardly or in the clockwise direction about the axis of the shaft 5 the overbalanced right-hand portion of the carrier 12 viewing Figures 2 and 3 will remain down while the left-hand portion rises, the carrier partaking of slight clockwise relative turning movement in relation to the arms 6 until the length of chain 36 becomes taut, whereafter upward movement of the left-hand ends of the arms 6 raises the carrier 12 without further turning of the carrier relatively to the arms.

One of the cross members of the carrier 12 is a plate 38 which extends transversely between and is welded to the side plates 33. A motor base 39 to which is bolted by bolts 40 a motor 41 is carried by the plate 38, the generally vertical position of the motor relatively to the plate 38 being adjusted and maintained by bolts 42. The motor base 39 is fastened to the plate 38 by bolts 43 which are tightened to maintain the motor in fixed position relatively to the plate and are loosened when the position of the motor relatively to the plate is to be adjusted.

The motor shaft is shown at 44. The axis of the motor and of its shaft 44 is inclined to the axis of the pipe P and since in the structure shown the axis of the pipe P is horizontal the motor axis is inclined to the horizontal. The motor axis is preferably in the same vertical plane as the axis of the pipe P; in other words, the motor axis and the pipe axis preferably intersect at an acute angle to define a substantially vertical plane.

Figure 3:
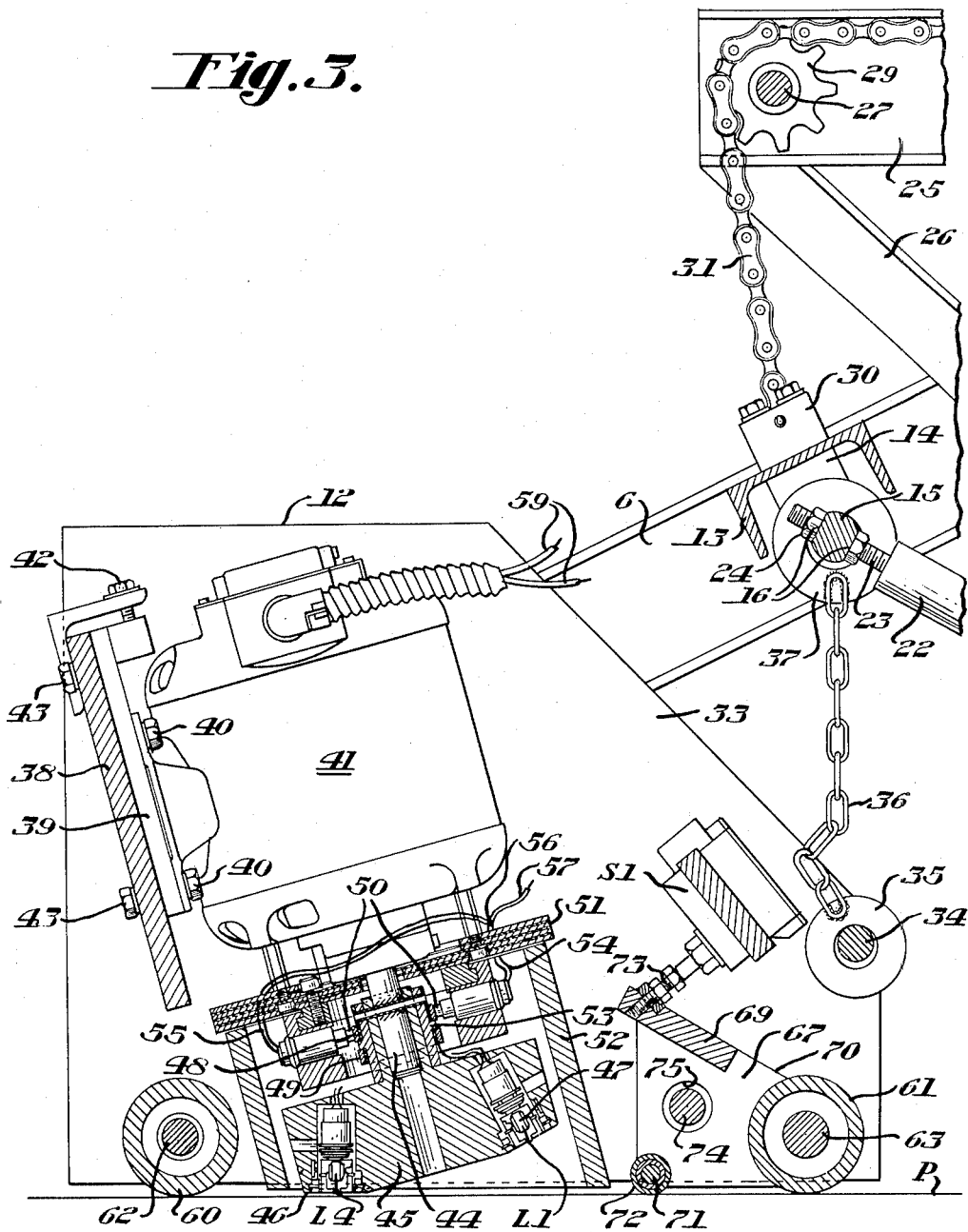
Figure 3 is an enlarged fragmentary detail elevational view, partly in vertical cross section, of a portion of the mechanism.

The motor shaft carries a head 45 which may be termed a sensing head or a detecting head which in axial cross section as shown in Figure 3 is of generally rectangular form but with the lower corners cut off so that the head has an annular face 46 which at its lowest portion lies immediately above the weld at the top of the pipe P. Thus a point on the annular face 46 as the head 45 rotates about the axis of the motor shaft moves in a path having portions approaching and receding from the pipe P and from the weld therein and also approaching and receding from a horizontal plane containing the weld. Such portions of the path are non-parallel to all planes containing the weld and are non-parallel to all planes containing the line along which the mechanism and the pipe relatively move generally rectilinearly one past the other. The aforementioned generally vertical plane defined by the intersecting axes of the motor shaft and pipe intersects the lowermost portion of the annular face 46 in a generally horizontal line substantially parallel to the axis of the pipe and to the weld.

Figure 5:
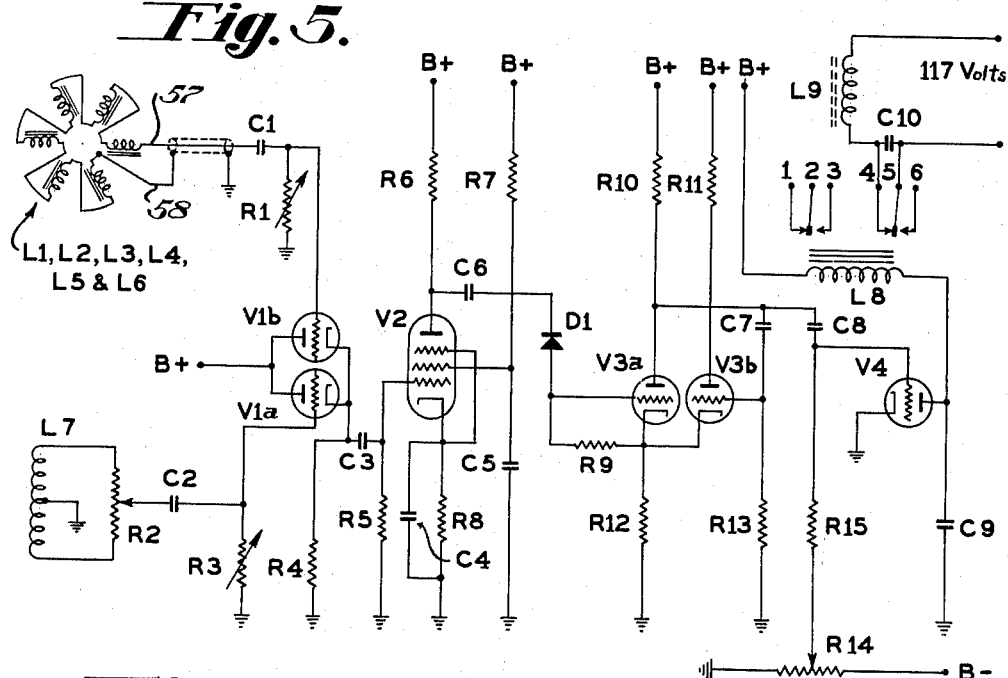
Figure 5 is a wiring diagram of the sensing and indicating mechanism.

The head 45 carries sensing means which upon rotation of the head pass through magnetic flux in space adjacent the weld caused by inhomogeneities in the weld as the head rotates whereby a flow of current is induced in the sensing means. The sensing means as shown comprise six sensing units respectively designated L1, L2, L3, L4, L5 and L6 mounted in the head 45 in equally spaced circular arrangement about the axis of the motor shaft 44 with each sensing unit arranged perpendicular to a tangent to the face 46 at the axis of the sensing unit. The sensing units may be of conventional construction. Shure Bros. tape recorder heads have been found satisfactory although other equivalent devices may be employed. Each of the sensing units has a coil 47. The coils 47 of the six sensing units are connected together in series, the end leads of the series extending generally upwardly and being electrically connected respectively to rings 48 and 49 mounted on an insulating collar 53 and insulated from each other. Brushes 50 engage the ring 48 and similar brushes not shown in Figure 3 but having their axes perpendicular to the plane of the paper viewing Figure 3 engage the ring 49. Leads from the brushes conduct the current induced in the sensing units by inhomogeneities in the weld to an electronic device operating a paint spray gun as will presently be described. The leads from the brushes 50 are shown at 54 and 55, those leads being joined together at 56 into a common lead 57 (see Figures 3 and 5). Similarly leads from the brushes which contact the ring 49 are joined together into a common lead 58 which is shown in Figure 5 but not shown in Figure 3 since the brushes which contact the ring 49 do not appear in Figure 3.

The mechanism will operate with one or more sensing units; the sensing portion of the mechanism should be small and its path of movement should have a point very close to the pipe if good signal definition is to be maintained. The head should rotate rapidly in order that the weld may be tested throughout substantially its entire length. Constant optimum spacing between the head and the pipe should be maintained. The speed of advance of the pipe is determined by the welding apparatus and may be of the order of sixty to one hundred feet per minute. The sensing units should follow one another into position directly above and in juxtaposition to the weld (the position in which the sensing unit L4 is shown in Figure 3) with such rapidity that there is no substantial space along the weld between the portions thereof which are sensed or tested by the respective sensing units. The greater the number of sensing units in the head the lower may be the motor speed for obtaining the same results. In the apparatus specifically disclosed the motor 41 is rated at 3450 R. P. M., being a ⅓ HP, single phase, 60 cycle, alternating current motor. Current to operate the motor is applied through leads 59. Between the motor and the head 45 is mounted a flux shield 51 and a peripheral shield 52 of generally truncated cylindrical form is mounted about the head to protect the sensing units from any stray flux. The operative angle between the motor shaft and the pipe axis being fixed, the cylindrical shield 52 is truncated or cut off at the bottom at such an angle that when the mechanism is operative with respect to a pipe its bottom edge will lie almost as close to the pipe at the points where such edge is directly above the pipe as the sensing units when they are respectively in their lowermost or operative positions (see Figure 3).

The head 45 is positioned relatively to the pipe by two rollers 60 and 61 which ride upon the top of the pipe. Since the weld is disposed at the top of the pipe the rollers 60 and 61 ride upon the weld. Since each of the rollers 60 and 61 has only substantially line contact with the pipe the rollers need not be of great length; it is convenient to make each of the rollers of a length of perhaps two or three inches. The roller 60 is journaled on a shaft 62 extending between the side plates 33. The roller 61 is journaled on a shaft 63 extending between the side plates 33. The rollers 60 and 61 may be similarly mounted. The mounting for the roller 61 is shown in Figure 4.

Figure 4:
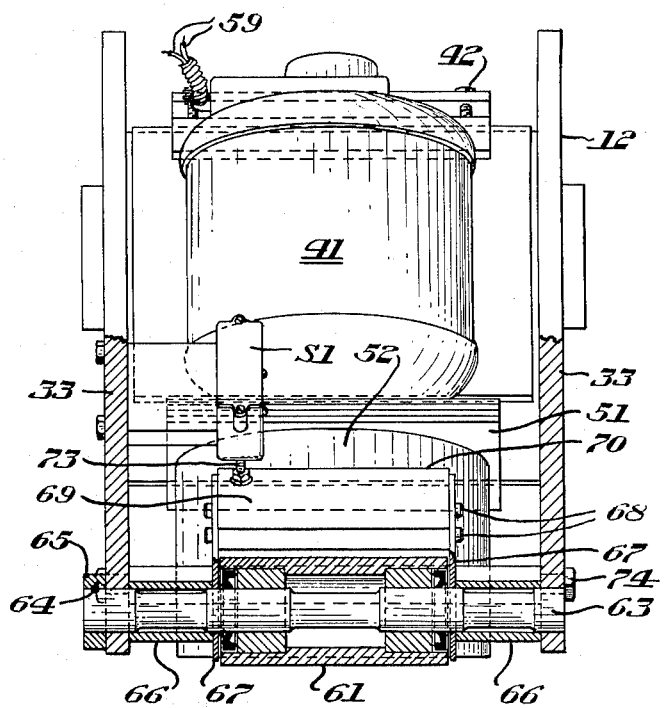
Figure 4 is an enlarged fragmentary vertical cross-sectional view taken on the line IV—IV of Figure 2.

The shaft 63 is maintained in axial position and against turning by a pin 64 entering a half bore in the shaft and a similar half bore in a bushing 65 connected with the left-hand side plates 33 viewing Figure 4. Spacing collars 66 surround the shaft 63 immediately inside the respective side plates 33. Pivoted to the shaft 63 inside the spacing collars 66 are plates 67 to which is bolted by bolts 68 a cross member 69, the plates 67 and cross member 69 cooperatively forming an operating member 70 pivoted to the shaft 63. The roller 61 is journaled on the shaft 63 inside the plates 67 as shown in Figure 4. Thus the roller 61 rides on the pipe while the operating member 70 is pivoted about the axis of the roller shaft 63.

Figure 6:
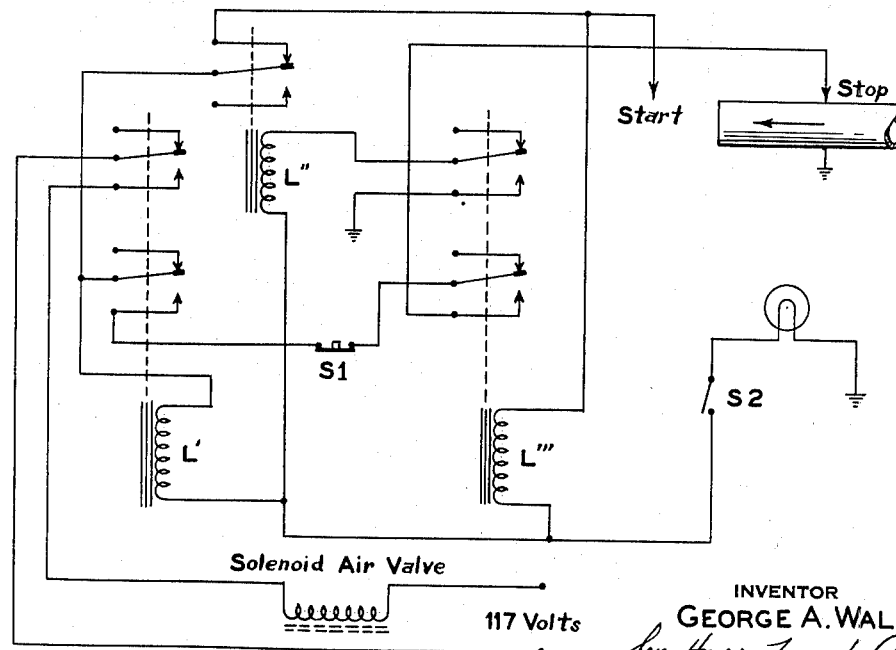
Figure 6 is a wiring diagram of the control mechanism for raising and lowering the sensing means.

The operating member 70 itself has a shaft 71 extending between the plates 67 and carrying a roller 72 of smaller diameter than the rollers 60 and 61 but which may be of the same length. When the mechanism is in operative position upon a pipe the roller 72 rides upon the pipe the same as do the rollers 60 and 61. However, the rollers 60 and 61 position the carrier 12 and the head 45 relatively to the pipe. The roller 72 is for the purpose of protecting the sensing means against damage by a bump or substantially raised portion at the top of the pipe. Such bump or raised portion when it is engaged by the roller 72 causes the operating member 70 to turn in the clockwise direction viewing Figure 3 about the axis of the shaft 63. The cross member 69 adjustably carries a switch actuating bolt 73 adapted when the operating member 70 is turned to a predetermined extent as above described by a bump or raised portion on the pipe to actuate a microswitch S1 (see Figures 3 and 6). The circuit involving the microswitch S1 is shown in Figure 6. The result of operation of that circuit when the microswitch S1 is actuated is to operate the piston in the cylinder 21 to raise the arms 6.

As the arms 6 begin to rise in their pivotal movement about the axis of the shaft 5 the roller 60 first rises from the pipe since the carrier 12 is permitted to tilt slightly toward the right viewing Figures 2 and 3 until the chain 36 becomes taut at which time the roller 61 is raised from the pipe. When the arms 6 are lowered the roller 61 first engages the pipe, such engagement being followed by a slight turning of the carrier 12 until the roller 60 also engages the pipe.

A rod 74 extending between the side plates 33 passes through openings 75 in the plates 67, which openings 75 are of substantially greater size than the rod 74. When the mechanism is in operative position on a pipe the rod 74 does not engage the plates 67 at the peripheries of the openings 75 but when the carrier 12 is raised out of contact with the pipe the rod 74 limits the extent to which the operating member 70 may turn in the counterclockwise direction about the axis of the shaft 63 viewing Figure 3.

Referring now to Figure 5, the electronic circuitry of the sensing and indicating mechanism comprises generally (1) the sensing units L1, L2, L3, L4, L5 and L6, (2) an interference eliminator to be more fully explained below and which may be omitted if not needed, (3) an amplifying stage which amplifies the voltage of the current induced in the sensing units, (4) a rectifying stage which rectifies the current whose voltage has been amplified and (5) a circuit including a solenoid which operates an automatic paint spray gun to spray paint on the pipe to indicate the location of inhomogeneities in the weld.

When the mechanism is in operative position with relation to a pipe moving from right to left viewing Figure 2 and with the head 45 being driven by the motor 41 the sensing units L1, L2, L3, L4, L5 and L6 pass through the fringe flux formed at a defect or inhomogeneity in the weld, it being understood that the pipe is magnetized in any convenient manner as well known in the art. In other words, the invention is directed to the testing of an article which has been magnetized, the magnetizing of the article being incident to but not constituting part of the invention claimed. Passage of the sensing units through the fringe flux produced by inhomogeneities in the weld generates current successively in the sensing units. The current thus generated is in pulses as the respective sensing units pass through their respective operative positions with respect to the pipe (the position in which the sensing unit L4 is shown in Figure 3). The pulses are coupled through condenser C1 to the grid of tube V1b. R1 is a variable resistance which provides a direct current return path for the grid of tube V1b and serves as a gain control on the unit. C1 and R1 in combination also act as a high pass filter, thus helping to discriminate against any unwanted signals which may be of lower frequency than the desired signal.

Early experience with the mechanism at a pipe mill in which it was installed was accompanied by interference of a 3000-cycle induction heater near the location of the mechanism. The induction heater superimposed 3000-cycle interference on the signal generated in the sensing units and thus interfered with operation of the mechanism. Interference pickup coil L7 and tube V1a with its associated circuits and components were added to minimize the 3000-cycle interference. The pickup coil L7 is stationarily mounted near the head 45 and thus is in a 3000-cycle field similar to that causing the interference. The signal from the coil L7 is developed across resistor R2 which is a potentiometer-type control and a signal is taken from R2 between the sliding arm and the grounded center tap of L7. This signal is coupled to the grid of tube V1a through condenser C2. Variable resistor R3 provides a direct-current return for this grid. In use, R2 and R3 are varied to adjust the phase and amplitude of the 3000-cycle signal applied to the grid of V1a until it is exactly equal in amplitude to the 3000-cycle signal present on the grid of V1b, and is exactly 180 degrees out of phase with it. The tubes V1a and V1b have a common cathode load resistor R4. The plates of V1a and V1b are connected to a suitable positive B voltage supply. The negative B connection is made to the ground point of the unit. V1a and V1b are identical triode types and may be enclosed in one envelope, as is the case with vacuum tube, type 6SN7GT. This type is used in the present instrument. Since the desired signal is present on the grid of V1b only, it is amplified, current-wise, and appears across load resistor R4. Since the 3000-cycle signal is present with identical amplitudes, but with 180-degree phase difference on the grids of V1a and V1b, the resulting 3000-cycle signals appearing across R4 are of equal amplitude but of opposite phase, and they add vectorially to zero. Thus, R4 is left with only the desired signal developed across it. This signal is coupled through condenser C3 to the control grid of the pentode amplifier tube, V2.

In the present device, tube V2 is a type 6SJ7. The signal fed through C3 is developed across grid resistor R5 which also provides a direct-current return for the control grid of V2. R6 serves as a load resistor for V2 and is connected from the plate to a suitable positive B voltage source whose negative connection is made to ground. In Figure 5 all points marked B+ are connected to the same suitable positive source. R8 is connected between the cathode of V2 and ground, and the plate current of V2 flowing through R8 produces a voltage drop of such nature as to provide proper bias for the stage. C4 is connected across R8 to substantially by-pass any variations in the voltage developed across R8 due to the signal being handled by the stage. The suppressor grid of V2 is connected to its cathode in the usual manner. R7 is a series dropping resistor provided to lower the B+ supply voltage to the proper value required for the screen grid of V2. Condenser C5 by-passes to ground any variation of signal voltage on the screen grid. V2 thus functions as a conventional voltage amplifier with a gain of about 200 times.

The signal developed across R6 is coupled through condenser C6 and diode D1 to the grid of tube V3a. D1 is a type 1N65 germanium diode. V3a and V3b (6SN7GT) are connected in a cathode-coupled single-shot multi-vibrator circuit. The purpose of this stage is to produce signals of constant amplitude and wave shape from signals of varying nature which are produced by the pick-up coils and amplified by V2. The diode D1 blocks the positive portion of the signal so that only negative pulses reach the grid of V3a. The operation of V3a and V3b is as follows: R12 is a cathode resistor common to both tubes. R9 is the direct-current grid return resistor for V3a, and R13 is the D.-C. grid return for V3b. R9 is returned to the cathode end of R12, thus normally providing zero bias for the grid of V3a. This causes V3a to be normally conducting in its plate circuit when no signal is applied to its grid. The plate current of V3a, passing through R12 to ground, produces a voltage drop across R12. Since R13 is returned to the ground point, this voltage serves as a negative bias for the grid of V3b. Thus, V3b is normally not conducting in its plate circuit. Application of the negative portion of the signal to the grid of V3a stops the plate current in V3a and starts it in V3b. The resulting decrease in voltage drop in R10, which is the plate load resistor for V3a, raises the plate voltage of V3a and, hence, the voltage impressed upon the series combination of R13 and C7 is also raised. C7, therefore, starts charging. The charging current flows through R13, producing a voltage drop which biases the grid of V3b positively, causing V3b to conduct. Now, since R11, the plate load resistor of V3b, has less resistance than R10, V3b will conduct more heavily than did V3a when the circuit was in the normal condition. This increased flow of plate current produces an increased voltage drop across R12 which raises the potential at the cathode end of R8. This change tends to reduce the charge on condenser C6, producing a discharge current through R9 and D1. This discharge current produces a voltage drop across R9 which biases the grid of V3a further in the negative direction. The process just described proceeds almost instantaneously until V3a is completely cut off and V3b is conducting fully. The tubes remain in this new, quasi-stable state for a period of time, depending on the capacity values of C7 and C6 and their associated charge and discharge paths. When these condensers reach their new states of charge, their charging currents approach zero and the bias voltages produced by these currents fail. Thus, for instance, when C6 has completed its discharge, the drop across R9 returns to zero, and V3a again begins to conduct. The process is again regenerative, and the transition back to the normal condition occurs with great speed. Considering the plate circuit of V3a, it will be seen that, when a negative pulse is applied to the grid of V3a, the plate current will abruptly cease and the voltage at the plate will rise. This new state will be maintained for a short period, and then V3a will again begin to conduct and the plate voltage will quickly return to its normal value. Thus, the application of a pulse at the grid of V3a produces a positive square pulse at the plate. Since the two conditions of the circuit represent maximum and minimum conductivity for V3a, the positive pulses at its plate are always of the same amplitude (about 50 volts). Since the time of dwell in the quasi-stable state is determined by circuit constants, the pulse produced is always of the same duration. Thus, a varying negative pulse has been exchanged for a positive pulse of constant amplitude and duration. This positive pulse is used to fire the relay tube.

The positive pulse obtained at the plate of V3a is coupled through condenser C8 to the grid of V4. R15 serves as a grid leak for the stage. R14 is a variable resistor in series with the negative B supply lead to ground. The tap on R14 supplies a constant negative bias for the grid of V4, since its cathode is returned to ground. The coil L8 is the coil of a relay, and is placed in series with the B+ lead to the plate. In normal operation, R14 is adjusted, with no signal on the grid of the stage, so that V4 is conducting and the relay coil L8 is energized. The application of the positive pulses through C8 causes grid current to flow, increasing the charge on condenser C8. When the pulse has disappeared, this charge leaks off through R15 and a portion of R14, producing a voltage drop which biases the grid of V4 negatively and cuts the plate current off. Thus L8 is de-energized and the relay's normally closed contacts make connection. C9 is connected from the plate of V4 to ground to prevent the relay from chattering due to the short, positive grid pulses. The normally closed contacts of the relay are connected in series with the solenoid of an automatic paint spray gun to a 110- to 117-volt A.-C. line. Thus, when signals are produced by the rotating pick-up coils, the relay is deenergized, the contacts close, and the solenoid is energized, causing the paint gun to spray a mark on the pipe. When the lack of a defect causes the signals to appear no longer, the process is reversed, and the paint is shut off. C10 is connected across the contacts of the relay, allowing some current to flow through the solenoid at all times, thus reducing the load on the contacts.

Figure 6 is a diagram showing the circuitry used to control the air cylinder 21 which raises and lowers the sensing head.

The pipe and mill are, of course, grounded. Two pigtail contactors are used to "feel" for the ends of the pipes, so that the head may be raised and lowered at appropriate times. The microswitch S1, above described, is arranged on the carrier 12 so that any obstruction on the top surface of the pipe will raise the safety roller 72 which opens S1, causing the head to be lifted off the pipe. The circuitry is so arranged that the head will not come back down until the next pipe has reached the pigtails. A 12-volt A.-C. source is connected in series with a switch S2 to supply current for the relays. The other 12-volt lead is grounded.

The operation of the circuit is as follows: As the front end of the pipe contacts the first pigtail, marked "Stop" on Figure 6, it is grounded but nothing happens, since the contacts of relay L''' are open. When the head end of the pipe contacts the second pigtail, marked "Start" on Figure 6, a circuit is completed from the 12-volt source, through S2, through the coil of relay L', through the contacts of relay L'', through the pigtail and pipe back to ground. Thus, the relay L' closes and its upper contacts close a circuit, energizing the solenoid air valve from its 117-volt supply line. This lowers the sensing head onto the pipe. At the same time that L' closes, however, L''' is also energized, and its contacts close. The upper set of contacts complete a circuit from the 12-volt source, through L'' and back to ground, causing L'' to be energized, opening its contacts. This opens the original circuit which closed relay L', but by now a holding circuit has been established for relay L'. This circuit is from the 12-volt source, through S2 and L', through the lower set of contacts on L', through S1, the microswitch, through the lower contacts on L''', back through the first pigtail and the pipe to ground. Thus, if this pigtail drops off the rear end of the pipe, or if S1 is opened by an obstruction passing under the roller, the holding circuit for L' is broken, and it is de-energized and opens the circuit to the air solenoid, causing the cylinder to lift the sensing unit from the pipe. Relays L'' and L''' are still energized, however, as long as the second pigtail is grounded and the original closing path for relay L' held open by the contacts on L''. Thus the circuit cannot reset until the tail end of the pipe leaves both pigtails. When that happens all relays are de-energized and the circuit returns to its original condition.

While a present preferred embodiment of the invention has been shown and described it is to be distinctly understood that the invention is not limited thereto but may be otherwise variously embodied within the scope of the following claims.

I claim:

1. In mechanism for locating inhomogeneities in a magnetized article, the mechanism and the magnetized article being arranged for relative movement one past the other, a head rotatable adjacent the magnetized article during relative movement of the mechanism and the magnetized article one past the other, the head being mounted for rotation generally in a plane at an acute angle to the direction of relative movement of the mechanism and the magnetized article one past the other, the head having its portion nearest the magnetized article shaped so that the surface thereof at each point therealong when it comes into the closest proximity with the magnetized article lies close and substantially parallel to the magnetized article, sensing means carried by said portion of the head passing through magnetic flux in space adjacent the magnetized article caused by inhomogeneities in the magnetized article as the head rotates whereby a flow of current is induced in the sensing means and indicating means with which the sensing means are connected operated by the thus induced current to indicate portions of the magnetized article having inhomogeneities.

2. In mechanism for locating inhomogeneities in a magnetized article, the mechanism and the magnetized article being arranged for relative movement one past the other, a head rotatable adjacent the magnetized article during relative movement of the mechanism and the magnetized article one past the other, the head being mounted for rotation generally in a plane at an acute angle to the direction of relative movement of the mechanism and the magnetized article one past the other, the end of the head nearest the magnetized article having a frusto-conical surface each element of which when in the closest proximity with the magnetized article lies substantially parallel to the direction of relative movement of the mechanism and the magnetized article one past the other, sensing means carried by the head passing through magnetic flux in space adjacent the magnetized article caused by inhomogeneities in the magnetized article as the head rotates whereby a flow of current is induced in the sensing means and indicating means with which the sensing means are connected operated by the thus induced current to indicate portions of the magnetized article having inhomogeneities.

3. In mechanism for locating inhomogeneities in a magnetized article, the mechanism and the magnetized article being arranged for relative movement one past the other, a head rotatable adjacent the magnetized article during relative movement of the mechanism and the magnetized article one past the other, the head being mounted for rotation generally in a plane at an acute angle to the direction of relative movement of the mechanism and the magnetized article one past the other, the end of the head nearest the magnetized article having a frusto-conical surface each element of which when in the closest proximity with the magnetized article lies substantially parallel to the direction of relative movement of the mechanism and the magnetized article one past the other, a plurality of sensing units carried by the head and spaced about the axis of rotation thereof, each arranged substantially perpendicular to the element of said frusto-conical surface nearest the center thereof, the sensing units passing through magnetic flux in space adjacent the magnetized article caused by inhomogeneities in the magnetized article as the head rotates whereby a flow of current is induced in the sensing units, and indicating means with which the sensing units are connected operated by the thus induced current to indicate portions of the magnetized article having inhomogeneities.

4. In mechanism for locating inhomogeneities in a magnetized article, the mechanism and the magnetized article being arranged for relative movement one past the other, the mechanism having sensing means, a support for the sensing means, means for moving the support to retract the sensing means away from the magnetized article, the sensing means being pivoted to the support about an axis transverse of the direction of relative movement between the mechanism and the magnetized article eccentrically with respect to the center of gravity of the sensing means so that when the support moves to retract the sensing means away from the magnetized article the sensing means turns relatively to the support, and means limiting the extent of such turning movement of the sensing means to maintain the sensing means in approximate orientation for return to operative position relatively to the magnetized article.

5. In mechanism for locating inhomogeneities in a magnetized article, the mechanism and the magnetized article being arranged for relative movement one past the other, the mechanism having an operating head including sensing means, a support for the head, means for moving the support to retract the head away from the magnetized article, the head having means for engaging with the magnetized article to relatively position the sensing means and the magnetized article upon relative movement of the defect locating mechanism and the magnetized article one past the other, the head being pivoted to the support about an axis transverse of the direction of relative movement between the mechanism and the magnetized article eccentrically with respect to the center of gravity of the head so that when the support moves to retract the head away from the magnetized article the head turns relatively to the support, and means extending between the support and the head limiting the extent of such turning movement of the head to maintain the head in approximate orientation for return to operative position relatively to the magnetized article.

6. In mechanism for locating inhomogeneities in a magnetized article, the mechanism and the magnetized article being arranged for relative movement one past the other, a support, an operating head pivoted to the support about an axis transverse of the direction of relative movement between the mechanism and the magnetized article eccentrically with respect to the center of gravity of the operating head for free turning movement about its pivotal connection with the support, the operating head having means adapted to engage the magnetized article during relative movement of the defect locating mechanism and the magnetized article one past the other to operatively position the operating head relatively to the magnetized article, means for moving the support to retract the operating head away from the magnetized article and means maintaining the operating head in approximate orientation for return to operative position relatively to the magnetized article when the operating head has been retracted away from the magnetized article.

7. In mechanism for locating inhomogeneities in a magnetized article, the mechanism and the magnetized article being arranged for relative generally rectilinear movement one past the other, a pivoted arm, sensing means pivoted to the arm and adapted upon pivotal movement of the arm to be moved generally in a plane containing a straight line parallel to the direction of relative generally rectilinear movement of the mechanism and the magnetized article whereby the sensing means are shifted between operative position adjacent the magnetized article and inoperative position relatively remote from the magnetized article, means connected with the arm for pivotally moving the arm, the sensing means having positioning means whereby the sensing means are properly oriented for cooperation with the magnetized article when the sensing means are in operative position and a connection between the sensing means and the arm maintaining the sensing means when in inoperative position in different orientation but adapted to assume properly oriented position relatively to the magnetized article upon pivotal movement of the arm to bring the sensing means into operative position.

8. In mechanism for locating inhomogeneities in a magnetized article, a base, a supporting arm pivoted to the base, a carrier pivoted to the supporting arm, a motor mounted on the carrier and having a shaft and a frusto-conical sensing head mounted on the motor shaft.

9. In mechanism for locating inhomogeneities in a magnetized article, a base, a supporting arm pivoted to the base, a carrier pivoted to the supporting arm, a motor mounted on the carrier and having a shaft extending at an angle to the horizontal, a frusto-conical sensing head mounted on the motor shaft below the motor and having a conical surface and sensing means mounted in the head perpendicular to the conical surface thereof.

10. In mechanism for locating inhomogeneities in a magnetized article, a base, a supporting arm pivoted to the base, a carrier pivoted to the supporting arm, a motor mounted on the carrier and having a shaft, a sensing head mounted on the motor shaft for rotation therewith and sensing means mounted on said head with the outer extremity of the sensing means forming a frusto-conical surface of revolution when the head is rotated.

References Cited in the file of this patent

UNITED STATES PATENTS

| | | |
|---|---|---|
| 1,954,975 | Zuschlag | Apr. 17, 1934 |
| 2,252,424 | Bigelow | Aug. 12, 1941 |
| 2,308,159 | Drummond | Jan. 12, 1943 |
| 2,410,803 | Barnes et al. | Nov. 12, 1946 |
| 2,563,254 | Lewis | Aug. 7, 1951 |